US008009861B2

(12) United States Patent
Lu et al.

(10) Patent No.: US 8,009,861 B2
(45) Date of Patent: Aug. 30, 2011

(54) METHOD AND SYSTEM FOR FINGERPRINTING DIGITAL VIDEO OBJECT BASED ON MULTIRESOLUTION, MULTIRATE SPATIAL AND TEMPORAL SIGNATURES

(75) Inventors: Jian Lu, Cupertino, CA (US); Yangbin Wang, Milpitas, CA (US)

(73) Assignee: Vobile, Inc., Santa Clara, CA (US)

( * ) Notice: Subject to any disclaimer, the term of this patent is extended or adjusted under 35 U.S.C. 154(b) by 1109 days.

(21) Appl. No.: 11/681,567

(22) Filed: Mar. 2, 2007

(65) Prior Publication Data
US 2007/0253594 A1 Nov. 1, 2007

Related U.S. Application Data

(60) Provisional application No. 60/795,786, filed on Apr. 28, 2006.

(51) Int. Cl.
*G06K 9/00* (2006.01)
(52) U.S. Cl. ...................................... 382/100
(58) Field of Classification Search .................. None
See application file for complete search history.

(56) References Cited

U.S. PATENT DOCUMENTS

| 4,792,226 | A | 12/1988 | Fishbine et al. | |
| 6,957,350 | B1 * | 10/2005 | Demos | 380/203 |
| 2002/0150164 | A1 * | 10/2002 | Felts et al. | 375/240.19 |
| 2003/0185417 | A1 | 10/2003 | Alattar et al. | |
| 2003/0202660 | A1 * | 10/2003 | Zhou et al. | 380/210 |
| 2005/0175224 | A1 | 8/2005 | Venkatesan et al. | |
| 2006/0165179 | A1 * | 7/2006 | Feuer et al. | 375/240.18 |
| 2007/0253594 | A1 * | 11/2007 | Lu et al. | 382/100 |
| 2008/0273741 | A1 * | 11/2008 | Fujii et al. | 382/100 |

FOREIGN PATENT DOCUMENTS

| WO | WO 2005/079072 | * | 8/2005 |
| WO | WO 2007/127590 A2 | | 11/2007 |

OTHER PUBLICATIONS

Mohatny, S. P., "Digital Watermarking: A Tutorial Review," from Department of Computer Science, University of South Florida, prepared in 1999 at the Indian Institute of Technology, Bangalore, India.
Su et al., "Statistical invisibility for collusion-resistant digital video watermarking," *IEEE Transactions on Multimedia*, Publication Date: Feb. 2005, vol. 7, Issue (1), p. 43-51.

* cited by examiner

*Primary Examiner* — Jingge Wu
*Assistant Examiner* — Tahmina Ansari
(74) *Attorney, Agent, or Firm* — Richard T. Ogawa; Ogawa P.C.

(57) ABSTRACT

A method and system for generating a fingerprint for a video object. The method includes obtaining a plurality of frames associated with a video object. Additionally, the method includes, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponding to a plurality of frame rates respectively.

31 Claims, 6 Drawing Sheets

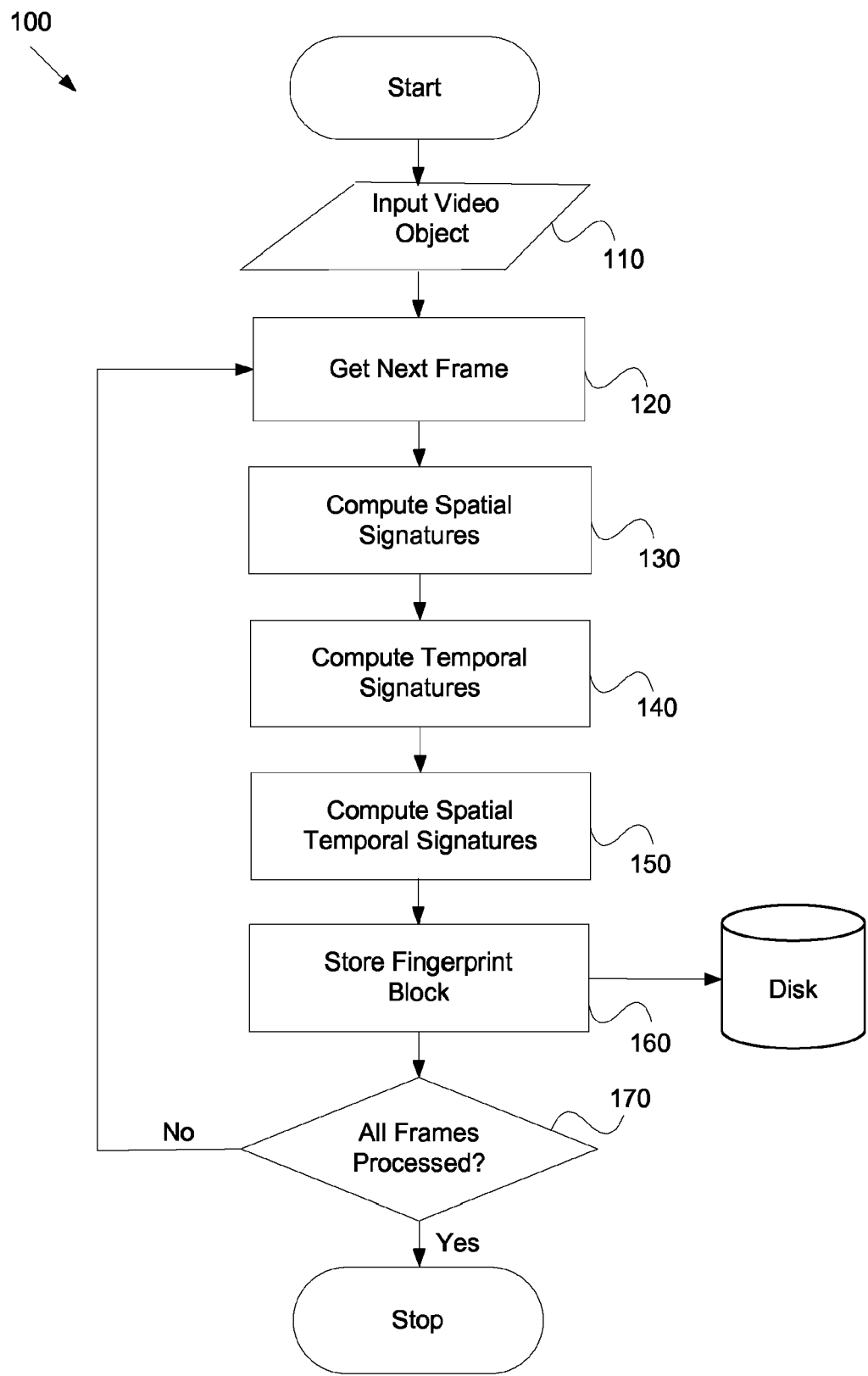
Figure 1: Process of fingerprinting a Video Object

 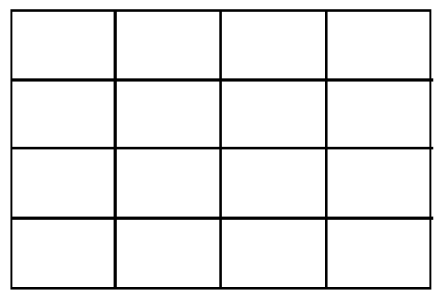
Figure 2: Computing Spatial Signatures at multiple resolutions. (a) a frame is divided into 2x2 blocks; (b) a frame is divided into 4x4 blocks.

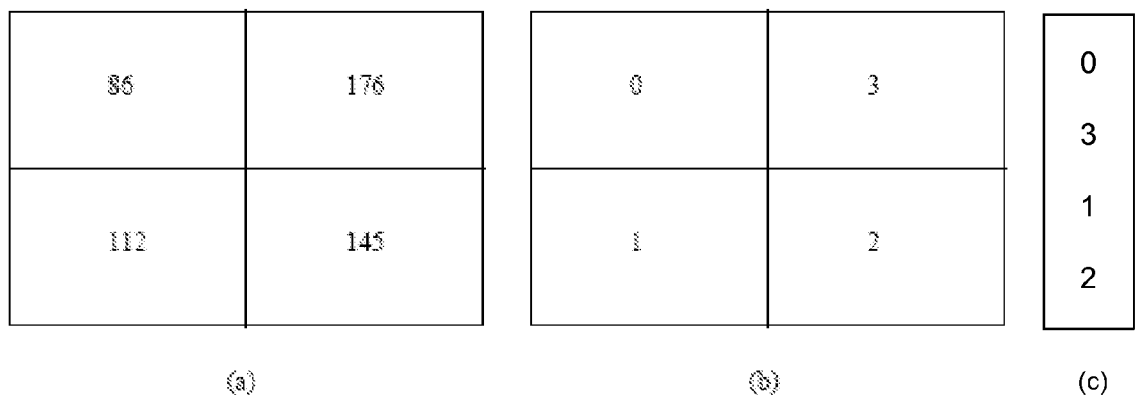
Figure 3:; Computing the Base Spatial Signature (BSS) over 2x2 blocks. (a) the mean pixel value of each block; (b) the ordinal rank of each block; (c) the BSS vector.

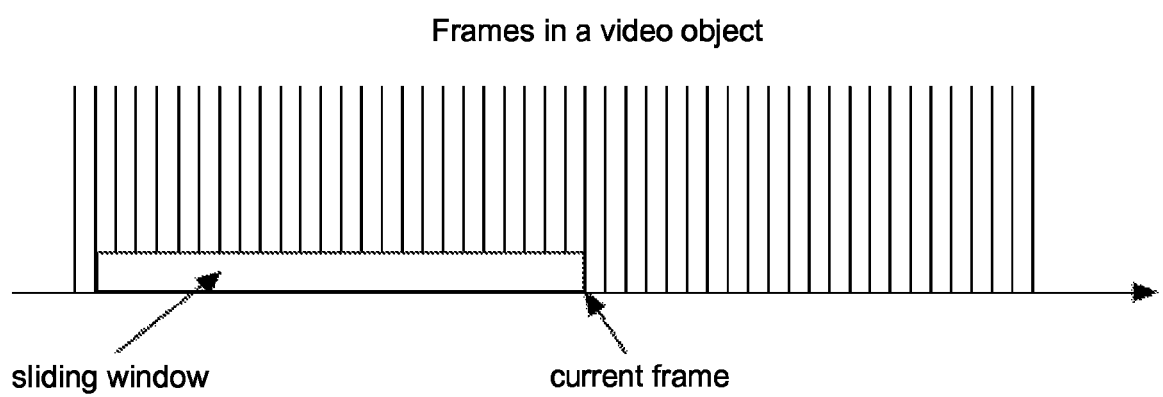
Figure 4: Positioning a sliding window in computing Temporal Signatures.

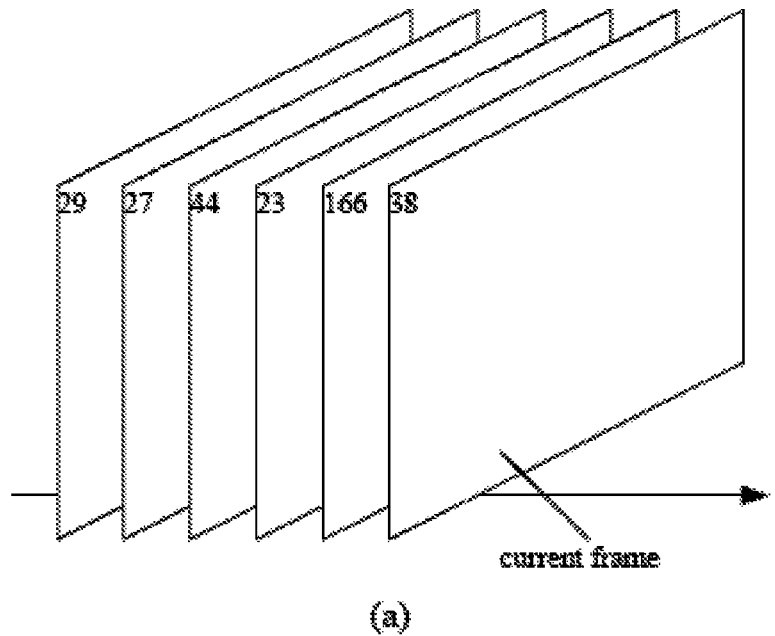
(a)
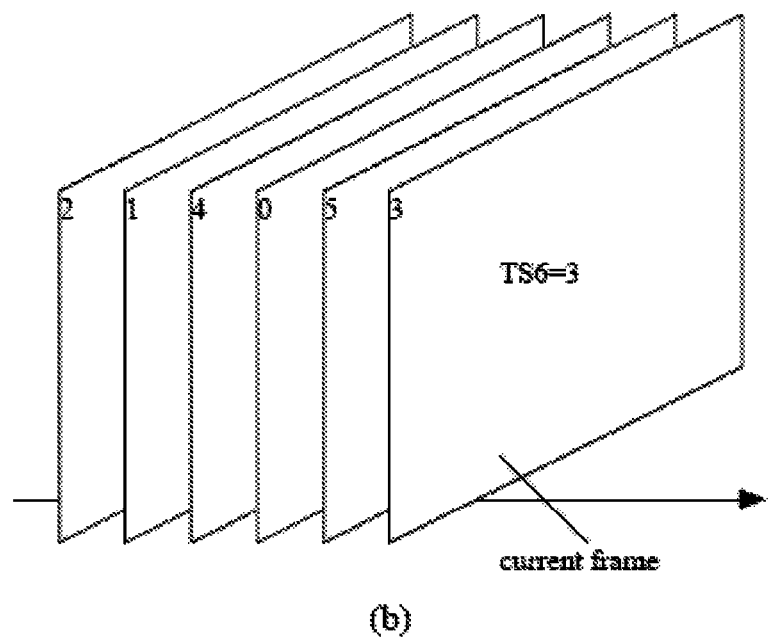
(b)
Figure 5: Computing the Temporal Signature over a downsampled group of frames. (a) the sum of absolute pixel difference between two consecutive frames; (b) the ordinal rank of each frame; the TS of the current frme is its ordinal rank.

METHOD AND SYSTEM FOR FINGERPRINTING DIGITAL VIDEO OBJECT BASED ON MULTIRESOLUTION, MULTIRATE SPATIAL AND TEMPORAL SIGNATURES

CROSS-REFERENCES TO RELATED APPLICATIONS

This application claims priority to U.S. Provisional Application No. 60/795,786, filed Apr. 28, 2006, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to techniques for characterizing and fingerprinting digital video object. In particular, this invention relates to method and system for generating a unique and robust identifier for a digital video object based multiresolution, multirate spatial and temporal signatures.

Digital video has become very popular in the last decade. There are many sources from which digital video is created, recorded and distributed, such as DV camcorders, DVD, DVR, and video download and streaming over the Internet. A piece of digital video is called a digital video object or simply video object in this document. It may be a file that is saved on a storage media such as a hard disk drive, or a bitstream that is transmitted over a broadcast channel or over the Internet. The constantly increasing number of digital video objects and proliferation of digital video entertainment and services demand effective and efficient methods and systems for indexing and identifying digital video objects.

A common method for uniquely identifying a digital object is to pass it through a hash function that produces a fixed-length output known as hash sum or message digest. A popular hash function is MD5 that is specified by RFC 1321. While a hash sum as an identifier is useful for certain purposes such as data integrity check, it is often inadequate for content identifications. For example, a digital video object may be encoded in various formats such as MPEG4 and Windows Media, and at various bitrates such as 2 Mbps for broadcast and 700 Kbps for Internet download. The hash sum value will be different for each of these formats though the content is the same. A fingerprint of a digital video object is different from a hash sum in that the former is a unique identifier for the video content while the latter is a unique identifier for the file. Having a unique and robust fingerprint for each and every video object enables many applications, such as video content indexing, search and retrieval, content filtering, broadcast monitoring, and metadata services.

BRIEF SUMMARY OF THE INVENTION

The present invention relates in general to video signal processing. More particularly, the invention provides a method and system for characterizing a digital video object. Merely by way of example, the invention is described as it applies to obtaining spatial signatures for multiple resolutions, temporal signatures for multiple frame rates, and/or spatial-temporal signatures, but it should be recognized that the invention has a broader range of applicability.

According to an embodiment of the present invention, a method for generating a fingerprint for a video object includes obtaining a plurality of frames associated with a video object. Additionally, the method includes, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponding to a plurality of frame rates respectively. Moreover, the method includes, for each of the plurality of frames, processing information associated with the plurality of spatial signatures and the plurality of temporal signatures, and determining a frame fingerprint for the each of the plurality of frames, the frame fingerprint including the plurality of spatial signatures corresponding to the plurality of resolutions respectively and the plurality of temporal signatures corresponding to the plurality of frame rates respectively. Also, the method includes processing a plurality of frame fingerprints for the plurality of frames respectively, the plurality of frame fingerprints including the frame fingerprint for the each of the plurality of frames. Additionally, the method includes determining a video fingerprint for the video object, the video fingerprint including the plurality of frame fingerprints.

According to another embodiment of the present invention, a method for generating a spatial signature for a frame of a video object includes obtaining a frame associated with a video object, and dividing the frame into a plurality of blocks, the plurality of blocks corresponding to a plurality of locations respectively. Each of the plurality of blocks includes a plurality of pixels, and the plurality of pixels corresponds to a plurality of pixel values respectively. Additionally, the method includes determining a plurality of average pixel values for the plurality of blocks respectively, processing the plurality of average pixel values, and determining a plurality of ranks for the plurality of blocks respectively based on at least information associated with the plurality of average pixel values. Each of the plurality of ranks corresponds to a block. Moreover, the method includes processing information associated with the plurality of ranks, and determining a sequence of ranks based on at least information associated with the plurality of ranks and the plurality of locations. A spatial signature for the frame includes information associated with the sequence of ranks.

According to yet another embodiment of the present invention, a method for generating a temporal signature for a frame of a video object includes obtaining a first plurality of frames associated with a video object. The first plurality of frames includes at least a frame, each of the first plurality of frames includes a first plurality of pixels and corresponds to an adjacent frame, and the adjacent frame includes a second plurality of pixels. Additionally, the method includes processing information associated with the first plurality of frames, and determining a plurality of difference values for the first plurality of frames respectively. Each of the plurality of difference values corresponds to the each of the first plurality of frames and the adjacent frame. Moreover, the method includes processing information associated with the plurality of difference values, and determining a plurality of ranks corresponding to the first plurality of frames respectively based on at least information associated with the plurality of difference values. The plurality of ranks includes a rank corresponding to the frame, and the rank is a temporal signature for the frame.

According to yet another embodiment of the present invention, a method for generating a spatial-temporal signature for a frame of a video object includes obtaining a first plurality of frames associated with a video object. The first plurality of frames includes at least a frame, and each of the first plurality of frames corresponds to an adjacent frame. Additionally, the method includes dividing each of the first plurality of frames. The divided frame includes a first plurality of blocks corresponding to a plurality of locations respectively, each of the first plurality of blocks corresponds to a second plurality of blocks including the each of the first plurality of blocks, and the second plurality of blocks is associated with blocks on the first plurality of frames respectively. Moreover, the method includes processing information associated with the first plurality of frames. Also, the method includes, for each of the first plurality of blocks, determining a plurality of difference values for the second plurality of blocks respectively. Each of the plurality of difference values is associated with the each of the second plurality of blocks and a corresponding block on the adjacent frame. Additionally, the method includes, for each of the first plurality of blocks, processing information associated with the plurality of difference values, determining a first plurality of ranks corresponding to the second plurality of blocks respectively based on at least information associated with the plurality of difference values, processing information associated with the first plurality of ranks, and determining a rank for the each of the first plurality of blocks based on at least information associated with the first plurality of ranks. Moreover, the method includes processing information associated with a second plurality of ranks corresponding to the first plurality of blocks respectively, and determining a sequence of ranks based on at least information associated with the second plurality of ranks and the plurality of locations for the first plurality of blocks. The second plurality of ranks includes the rank, and a spatial-temporal signature for the frame includes information associated with the sequence of ranks.

According to yet another embodiment of the present invention, a computer program product includes a computer readable medium including instructions for generating a fingerprint for a video object. The computer readable medium includes one or more instructions for obtaining a plurality of frames associated with a video object. Additionally, the computer readable medium includes one or more instructions for, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponds to a plurality of frame rates respectively. Moreover, the one or more instructions are for, for each of the plurality of frames, processing information associated with the plurality of spatial signatures and the plurality of temporal signatures, and determining a frame fingerprint for the each of the plurality of frames. The frame fingerprint includes the plurality of spatial signatures corresponding to the plurality of resolutions respectively and the plurality of temporal signatures corresponding to the plurality of frame rates respectively. Also, the computer readable medium includes one or more instructions for processing a plurality of frame fingerprints for the plurality of frames respectively, and one or more instructions for determining a video fingerprint for the video object. The plurality of frame fingerprints includes the frame fingerprint for the each of the plurality of frames, and the video fingerprint includes the plurality of frame fingerprints.

According to yet another embodiment of the present invention, a computer program product includes a computer readable medium including instructions for generating a spatial signature for a frame of a video object. The computer readable medium includes one or more instructions for obtaining a frame associated with a video object, and one or more instructions for dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the computer readable medium includes one or more instructions for determining a plurality of average pixel values for the plurality of blocks respectively, one or more instructions for processing the plurality of average pixel values, and one or more instructions for determining a plurality of ranks for the plurality of blocks respectively based on at least information associated with the plurality of average pixel values, each of the plurality of ranks corresponding to a block. Moreover, the computer readable medium includes one or more instructions for processing information associated with the plurality of ranks, and one or more instructions for determining a sequence of ranks based on at least information associated with the plurality of ranks and the plurality of locations. A spatial signature for the frame includes information associated with the sequence of ranks.

According to yet another embodiment of the present invention, a computer program product includes a computer readable medium including instructions for generating a temporal signature for a frame of a video object. The computer readable medium includes one or more instructions for obtaining a first plurality of frames associated with a video object. The first plurality of frames includes at least a frame, each of the first plurality of frames includes a first plurality of pixels and corresponds to an adjacent frame, and the adjacent frame includes a second plurality of pixels. Additionally, the computer readable medium includes one or more instructions for processing information associated with the first plurality of frames, and one or more instructions for determining a plurality of difference values for the first plurality of frames respectively. Each of the plurality of difference values corresponding to the each of the first plurality of frames and the adjacent frame. Moreover, the computer readable medium includes one or more instructions for processing information associated with the plurality of difference values, and one or more instructions for determining a plurality of ranks corresponding to the first plurality of frames respectively based on at least information associated with the plurality of difference values. The plurality of ranks includes a rank corresponding to the frame, and the rank is a temporal signature for the frame.

According to yet another embodiment of the present invention, a computer program product includes a computer readable medium including instructions for generating a spatial-temporal signature for a frame of a video object. The computer readable medium includes one or more instructions for obtaining a first plurality of frames associated with a video object. The first plurality of frames includes at least a frame, and each of the first plurality of frames corresponds to an adjacent frame. Additionally, the computer readable medium includes one or more instructions for dividing each of the first plurality of frames. The divided frame includes a first plurality of blocks corresponding to a plurality of locations respectively, each of the first plurality of blocks corresponds to a second plurality of blocks including the each of the first plurality of blocks, and the second plurality of blocks is associated with blocks on the first plurality of frames respectively. Moreover, the computer readable medium includes one or more instructions for processing information associated with the first plurality of frames. Also, the computer readable medium includes one or more instructions for, for each of the first plurality of blocks, determining a plurality of difference values for the second plurality of blocks respectively, processing information associated with the plurality of difference values, determining a first plurality of ranks corresponding to the second plurality of blocks respectively based on at least information associated with the plurality of difference values, processing information associated with the first plurality of ranks, and determining a rank for the each of the first plurality of blocks based on at least information associated with the first plurality of ranks. Each of the plurality of difference values is associated with the each of the second plurality of blocks and a corresponding block on the adjacent frame. Additionally, the computer readable medium includes one or more instructions for processing information associated with a second plurality of ranks corresponding to the first plurality of blocks respectively, and one or more instructions for determining a sequence of ranks based on at least information associated with the second plurality of ranks and the plurality of locations for the first plurality of blocks. The second plurality of ranks includes the rank, and a spatial-temporal signature for the frame includes information associated with the sequence of ranks.

Many benefits are achieved by way of the present invention over conventional techniques. Certain embodiments of the present invention can generate a robust fingerprint which either does not change or change only slightly with different formats, bitrates, or resolutions, and/or with certain alterations and/or distortions for the same video object. Some embodiments of the present invention can generate a fingerprint that is highly discriminating so that two video objects containing different video contents would yield significantly different fingerprints. Certain embodiments of the present invention can generate a fingerprint that is compact for storage, and can be stored in a form for efficient search and matching.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 1 is a flowchart of the algorithm for charactering and fingerprinting digital video object according to the present invention.

FIG. 2 illustrates the ways of subdividing a frame for computing the Spatial Signatures at multiple resolutions according to the present invention.

FIG. 3 illustrates the process of computing the Base Spatial Signature over 2×2 blocks in a specific embodiment according to present invention.

FIG. 4 illustrates the positioning of a sliding window for computing Temporal Signatures according to present invention.

FIG. 5 illustrates the process of computing the Temporal Signature in a downsampled group of frames in a specific embodiment according to present invention.

DETAILED DESCRIPTION OF THE INVENTION

Figure 6:
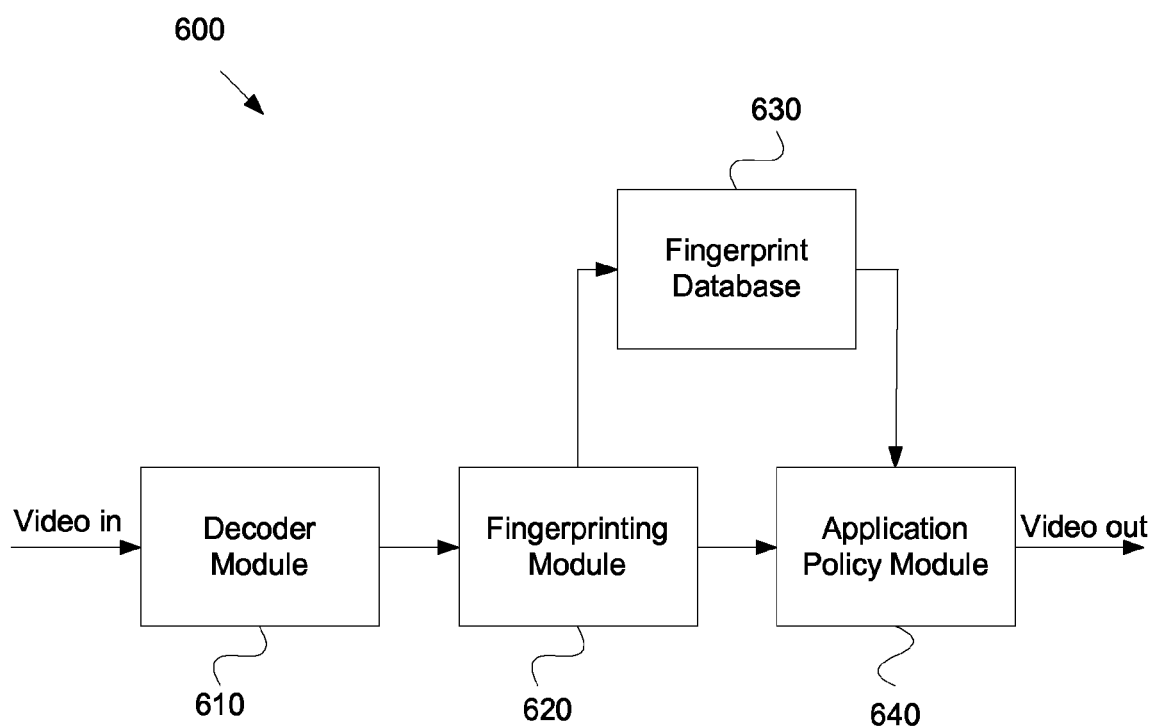
FIG. 6 is a simplified system implementing the method for characterizing and fingerprinting a digital video object according to an embodiment of the present invention.

The present invention covers method and system for characterizing video content by its intrinsic features and transforming these features into a compact signature or fingerprint. Because the same video content may be encoded in different formats, bitrates, or resolutions, and the video content may be cut, edited, or subject to various degree of distortion, it is important that the fingerprint characterizing the video object is robust, to the degree that it is invariant or varying only slightly under these circumstances. On the other hand, the fingerprint must be highly discriminating in the sense that two video objects containing different video content should yield very different fingerprints. Furthermore, the data representation of the video fingerprint must be sufficiently compact for storage, and can be stored in a form for efficient search and matching.

Fingerprinting Video Object

The process of fingerprinting a video object according to the present invention is shown with the block diagram in FIG. 1. Each frame is processed in display order, producing a spatial signature block (SSB), a temporal signature block (TSB), and an optional spatial-temporal signature block (STSB). The SSB consists of one or multiple spatial signatures (SS) in multiple resolutions; the TSB consists of one or multiple temporal signatures (TS) in multiple framerates; the STSB consists of spatial-temporal signatures (STS) in multiple resolutions and multiple framerates. For each frame in a video object, the SSB, TSB, and STSB form a fingerprint block of the corresponding frame. The sequence of all fingerprint blocks in frame order form the fingerprint for the video object. In the following the method for computing SSB, TSB, and STSB is described. In this specific embodiment, all signatures and the fingerprints are computed in Luma component only. In more generalized cases, the signatures and fingerprints can be computed in both Luma and Chroma components, or in any or all components in RGB or other color spaces.

Spatial Signatures

Spatial Signatures (SS) for a video frame can be computed at multiple resolutions. In one implementation according to the present invention, a frame is divided evenly into 2×2 or 4 blocks of equal size, as shown in FIG. 2(a). This is the lowest resolution for frame subdivision in computing the SS; the resulting SS is called Base Spatial Signature, or BSS. Going up one level in resolution, the frame can be divided into 4×4 or 16 blocks, as shown in FIG. 2(b). Going up further in resolution by finer frame subdivision, such as 8×8 or 64 blocks, can produce SS in finer resolutions. It is possible to compute the BSS using a different frame subdivision, such as 3×3 or 9 blocks, and extend to higher resolution by successively doubling its dimensions to, e.g., 6×6=36 blocks, and 12×12=144 blocks. But we find that computing BSS using 2×2=4 blocks is more robust against certain image transformations such as an aspect ratio change.

Using the 2×2 block pattern in FIG. 2(a), the BSS is computed as follows:

1. For each block, compute of mean of pixel value as follows:

$$B_i = (\Sigma x(k))/N_i, k=1,2,3,\ldots,N_i$$

where $B_i$ is the mean pixel value of the i-th block, x(k) is a pixel value inside the i-th block, and $N_i$ is the number of pixels in the i-th block. See an example in FIG. 3(a).
2. Compare and rank the value of $B_i$ among the blocks and assign the ordinal rank to each block. See an example in FIG. 3(b).
3. Generate the BSS by collecting the ordinal rank of each block in raster order and forming a BSS vector. See an example in FIG. 3(c).

The SS at higher resolution can be computed following the same steps as above. The only difference is that the SS vector at a higher resolution has higher dimensions. For example, the BSS vector computed using 2×2 blocks is of dimension 4, while the SS vector computed using 4×4 blocks is of dimension 16.

Since each ordinal rank in 2×2 blocks can be represented with log 2(4)=2 bits, it's easy to see that the BSS can be represented with 4*log 2(4)=8 bits. Similarly, it's easy to see that the SS over 4×4 blocks can be represented with 16*log 2(16)=64 bits. Required bits for representing the SS at even higher resolution can be calculated in a similar way.

The SSB for a frame is formed by stacking the BSS and the SS at all resolutions that are available. In the specific embodiment that is described above, the SSB can be represented with 8+64=72 bits.

Temporal Signatures

The Temporal Signatures (TS) are computed for each frame over a sliding time window.

For each frame, the window is positioned such that the current frame is on the right edge of the window (See FIG. 4). The position of the window is moved one frame at a time along the temporal axis. The size of the window is a parameter that can be adjusted. In one embodiment according to the present invention, the size of the sliding window is defined to be 1 second in time. This means there will be a number of frames falling in the sliding window at any position of the window, and that number depends on the framerate of the video object. For example, if the framerate of a video object is 30 fps, there will be 30 frames in the sliding window at any position of the window. If the framerate of a video object is less than 1 fps, there will be no frame inside the sliding window for any position of the window.

In order to make the TS comparable for video objects of different framerates, the framerate of each video object is downsampled to a set of common framerates. The set of common framerates for a video object to be downsampled to can be adjusted. Generally speaking, they are designed to be representative of the TS at multiple framerates. In one embodiment according to the present invention, the specific set of common framerates that are used to compute the TS is {6 fps, 12 fps, 24 fps}.

Framerate downsampling to the set of common framerates produces multiple groups of frames. The TS is computed over each group of frames, resulting multirate TS. For clarity in this document, the TS computed from a particularly group will be labeled by the downsampled framerate of that group. For example, TS6 indicates that it is the TS computed from the group of frames of 6 fps.

Using the downsample set of {6 fps, 12 fps, 24 fps} and their associated downsampled groups of frames, the TS is computed in the following steps:
1. For each group of frames, compute the sum of absolute difference of corresponding pixels between two consecutive frames in the group, that is, $$D_i = \Sigma |x_i(k) - x_{i-1}(k)|, k=1,2,3 \ldots N.$$

where i is the index for the i-th frame in the group, and k=1, 2, 3, ..., N is the pixel index in a frame. See FIG. 5(a)
2. Compare and rank the value of $D_i$ among the frames in the group and assign the ordinal rank to each frame. See FIG. 5(b).
3 Record the ordinal rank of the current frame (i.e. the frame on the right edge of the sliding window). This is the TS of the current frame in the group. See FIG. 5(b).

Since the ordinal rank is no greater than the number of frames in the group, it is easy to see TS6 can be represented with γ log 2(6)/3 bits; TS12 can be represented with γ log 2(12)/4 bits; TS24 can be represented with γ log 2(24)/5 bits. Here the operator γ] denotes a mathematical ceiling function. For example, γ4.2/=5.

The TSB for a frame is formed by stacking the TS at all framerates that are available. In the specific embodiment that is described above, the TSB can be represented with 3+4+5=12 bits.

Spatial-Temporal Signatures

Spatial-Temporal Signatures (STS) are computed for each frame over a sliding window of subdivided frames. Frames may be subdivided in various ways as described previously for computing the SS at multiple resolutions. In one specific embodiment, the frame is subdivided into 2×2 blocks. The TS is computed for each block in a frame in the same way as described previously, resulting 4 TS per frame for each downsampled group. The STS is formed by collecting the resulting TS in raster order and put them in a vector. The STSB is formed by stacking the STS at all framerates that are available. In this specific embodiment, the STSB can be represented with 4*(3+4+5)=48 bits.

Fingerprint from Spatial and Temporal Signatures

The collection of SSB, TSB, and optionally STSB for a frame form the Fingerprint Block (FB) for the corresponding frame. A sequence of FBs corresponding to each frame in a video object is defined to be the fingerprint for the video object. In the specific embodiment that is described in this document, a FB can be represented with 84 bits without STSB, or 132 bits with STSB. The fingerprint so defined will have a data rate of 2,520 bits/s (3,930 bits/s if STSB included) for video objects with framerate of 30 fps.

As discussed above, FIG. 1 is a simplified method for characterizing and fingerprinting a digital video object according to an embodiment of the present invention. This diagram is merely an example, which should not unduly limit the scope of the claims. One of ordinary skill in the art would recognize many variations, alternatives, and modifications. The method 100 includes a process 110 for receiving video object, a process 120 for obtaining next frame, a process 130 for determining one or more spatial signatures, a process 140 for determining one or more temporal signatures, a process 150 for determining one or more spatial-temporal signatures, a process 160 for storing fingerprint block, and a process 170 for determining whether all frames have been processed. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method are performed by a computer or a processor directed by a code. In another example, some or all processes of the method are performed according to instructions included by a computer-readable medium in a computer program product. Further details of these processes are found throughout the present specification.

After a video object is received at the process 110, the video object is processed. For example, the video object is a piece of video, such as a piece of digital video. In another example, the video object includes one or more frames, which are obtained and processed according to FIG. 1. In one embodiment, the frames are processed in their display order. In another embodiment, for each frame, a spatial signature block (SSB), a temporal signature block (TSB), and/or a spatial-temporal signature block (STSB) are determined. For example, the SSB includes one or more spatial signatures (SS) in one or more resolutions; the TSB includes one or more temporal signatures (TS) in one or more framerates; and/or the STSB includes one or more spatial-temporal signatures (STS) in one or more resolutions and one or more framerates. In yet another embodiment, the SSB, the TSB, and/or the STSB of the same frame form at least part of a fingerprint block of this frame. For example, a fingerprint block is a frame fingerprint. According to FIG. 1, after the fingerprint block is stored, it is determined whether all frames have been processed at the process 170. If not all frames have been processed, next frame is obtained and processed. The sequence of all fingerprint blocks in frame order form at least part of fingerprint for the video object according to an embodiment of the present invention.

Further emphasized here, FIG. 1 is merely an example, which should not unduly limit the scope of the claims. One of ordinary skill in the art would recognize many variations, alternatives, and modifications. For example, the process 170 for determining whether all frames have been processed can be replaced by a process for determining whether additional frames need to be processed. In another example, one or more of the process 130 for determining one or more spatial signatures, the process 140 for determining one or more temporal signatures, and the process 150 for determining one or more spatial-temporal signatures are skipped.

As discussed above, FIG. 2 illustrates examples of subdividing a frame for determining Spatial Signatures at multiple resolutions according to an embodiment of the present invention. FIG. 2 includes FIGS. 2(*a*) and (*b*). These diagrams are merely examples, which should not unduly limit the scope of the claims. One of ordinary skill in the art would recognize many variations, alternatives, and modifications.

As shown in FIG. 2(*a*), a frame is divided into $m_b$ by $n_b$ blocks according to an embodiment. For example, each of $m_b$ and $n_b$ is a positive integer. In another example, $m_b$ and $n_b$ are the same or different in value. In yet another example, all of the $m_b$ by $n_b$ blocks have the same size. As shown in FIG. 2(*b*), the frame is divided into $m_h$ by $n_h$ blocks according to an embodiment. For example, each of $m_h$ and $n_h$ is a positive integer. In another example, $m_h$ and $n_h$ are the same or different in value. In yet another example, all of the $m_h$ by $n_h$ blocks have the same size.

In one embodiment, the spatial signature (SS) based on $m_b$ by $n_b$ blocks is called Base Spatial Signature (BSS), and the spatial signature (SS) based on $m_h$ by $n_h$ blocks is called Spatial Signature (SS) at higher resolution. For example, $m_h$ is larger than $m_b$, and/or $n_h$ is larger than $n_b$. In another example, both $m_b$ and $n_b$ are equal to 2, and both $m_h$ by $n_h$ are equal to 2 multiplied by $2^i$, where n is a positive integer. In yet another example, both $m_b$ and $n_b$ are equal to 3, and both $m_h$ by $n_h$ are equal to 3 multiplied by $2^n$.

As discussed above, FIG. 3 illustrates a process of determining the Base Spatial Signature over 2×2 blocks according to an embodiment of the present invention. FIG. 3 includes FIGS. 3(*a*), (*b*), and (*c*). These diagrams are merely examples, which should not unduly limit the scope of the claims. One of ordinary skill in the art would recognize many variations, alternatives, and modifications. For example, the BSS based on $m_b$ by $n_b$ blocks can be calculated in substantially the same manner, even if either $m_b$ or $n_b$ or both are not equal to 2. In another example, the SS based on $m_h$ by $n_h$ blocks can be calculated in substantially the same manner.

As shown in FIG. 3, the method for determining spatial signature based on $m_b$ by $n_b$ blocks or $m_h$ by $n_h$ blocks includes the following three processes:

1. For each block, determining average of pixel values as follows:

$$B_i = \sum_{k=1}^{N_i} x(k)/N_i$$

where $B_i$ is the average pixel value of the i-th block, x(k) is the pixel value for the kth pixel inside the i-th block, and $N_i$ is the number of pixels in the i-th block. In one embodiment, $i=1, 2, \ldots, m_b \times n_b$. In another embodiment, $i=1, 2, \ldots, m_h \times n_h$.

2. Determining a ranking number for each block. For example, the value of $B_i$ is compared among the blocks, and the ordinal ranking number for the $B_i$ is assigned to the corresponding block. In one embodiment, the total number of blocks equals $m_b \times n_b$, so the ranking number ranges from 1 to $m_b \times n_b$. In another embodiment, the total number of blocks equals $m_h \times n_h$, so the ranking number ranges from 1 to $m_h \times n_h$.

3. Determining spatial signature based on ranking numbers. For example, the spatial signature is BSS, or SS at higher resolution. In another example, the spatial signature includes a vector. Within the vector, the ranking numbers for the blocks are arranged based on the physical locations of these blocks within the frame. In one embodiment, the ranking numbers are collected in raster order and thus a spatial signature is generated.

After spatial signatures at multiple resolutions are determined for a frame, the SSB is determined by stacking the BSS and the SS at one or more higher resolutions according to an embodiment of the present invention.

FIG. 4 illustrates the positioning of a sliding window for computing Temporal Signatures according to an embodiment of the present invention. This diagram is merely an example, which should not unduly limit the scope of the claims. One of ordinary skill in the art would recognize many variations, alternatives, and modifications.

As shown in FIG. 4, for each frame, the sliding window is positioned such that the current frame is on the right edge of the window. The position of the window is moved one frame at a time along the temporal axis. The width of the window is a parameter that can be adjusted. In one embodiment, the width of the window is 1 second in time. For example, a number of frames fall within the sliding window, and the number of such frames depends on the framerate of the video object. According to one embodiment, if the framerate used for determining temporal signature is the original framerate of the video object, the frame or frames are the original frame or frames of the video object. According to another embodiment, if the framerate used for determining temporal signature is different from the original framerate of the video object, the frame or frames are the sampled frame or frames of the video object. For example, the framerate used for determining temporal signature is lower than the original framerate of the video object, so the video object is temporally downs amp led.

For a particular sampled framerate used, the method for determining temporal signature includes the following three processes:

1. Determining differences between a frame and its adjacent frame. For example, the sum of absolute differences of corresponding pixels between two consecutive frames is calculated as follows:

$$D_i = \sum_{k=1}^{N} |x_i(k) - x_{i-1}(k)|$$

where i is the index for a frame. For example, $D_i$ is calculated for each frame within the sliding window. Additionally, k represents the kth pixel and N represents the total number of pixels in the frame.

2. Determining a ranking number for the current frame. For example, the value of $D_i$ are compared among all the frames within the sliding window, and the ordinal ranking number for the $D_i$ is assigned to the corresponding frame. In one embodiment, the ordinal ranking number is assigned to the current frame, which resides at the right edge of the sliding window.

3. Recording the ordinal ranking number of the current frame as the temporal signature of the current frame.

After temporal signatures based on multiple framerates are determined for a frame, the TSB is determined by stacking the TS at multiple framerates according to an embodiment of the present invention.

As discussed above, Spatial-Temporal Signatures (STS) are computed for each frame over a sliding window of subdivided frames according to an embodiment of the present invention. For example, a frame is divided into m by n blocks, where each of m and n is a positive integer. In another example, m and n are the same or different in value. In yet another example, all of the m by n blocks have the same size.

In one embodiment, the TS is computed for each block in the frame. For a particular sampled framerate used, the method for determining temporal signature for each block includes the following two processes:

1. Determining differences between a block on a frame and its corresponding block on an adjacent frame. According to one embodiment, if the framerate used for determining temporal signature is the original framerate of the video object, the frames are the original frames of the video object. According to another embodiment, if the framerate used for determining temporal signature is different from the original framerate of the video object, the frames are the sampled frames of the video object. For example, the framerate used for determining temporal signature is lower than the original framerate of the video object, so the video object is temporally downsampled.

For example, the sum of absolute differences of corresponding pixels between two corresponding blocks on two consecutive frames is calculated as follows:

$$D_i = \sum_{k=1}^{N} |x_i(k) - x_{i-1}(k)|$$

where i is the index for a frame. For example, $D_i$ is calculated for the corresponding block of each frame within the sliding window. Additionally, k represents the kth pixel within the corresponding block, and N represents the total number of pixels in the block.

2. Determining a ranking number for the block on the current frame. For example, the value of $D_i$ are compared among all the corresponding blocks on all the frames within the sliding window, and the ordinal ranking number for the $D_i$ is assigned to the corresponding block. In one embodiment, the ordinal ranking number is assigned to the block on the current frame, which resides at the right edge of the sliding window.

These two processes are repeated to determine the ordinal ranking numbers for all m-by-n blocks on the current frame according to an embodiment. The spatial-temporal signature is then determined based on ranking numbers of blocks on the current frame. For example, the spatial-temporal signature includes a vector. Within the vector, the ranking numbers for the blocks are arranged based on the physical locations of these blocks within the current frame. In one embodiment, the ranking numbers are collected in raster order and thus a spatial-temporal signature is generated.

As discussed, the spatial-temporal signature is determined based on the framerate used for determining the TS for each block of the current frame. In one embodiment, spatial-temporal signatures are determined based on multiple framerates for the current frame, and the STSB is determined by stacking the STS at multiple framerates according to an embodiment of the present invention.

For each frame, one or more of SSB, TSB, and STSB, with or without any other information, can form the Fingerprint Block (FB) for the corresponding frame according to an embodiment of the present invention. For example, a Fingerprint Block (FB) is a frame fingerprint, which includes one or more spatial signatures, one or more temporal signatures, and/or one or more spatial-temporal signatures. For a sequence of frames of a video object, the corresponding sequence of FBs can be used as the fingerprint for the video object according to another embodiment of the present invention. For example, if the framerate used for determining temporal signature is the original framerate of the video object, the frames are the original frames of the video object. According to another embodiment, if the framerate used for determining temporal signature is different from the original framerate of the video object, the frames are the sampled frames of the video object. The fingerprint of the video object is stored in a database according to an embodiment of the present invention. For example, the database includes one or more fingerprints of one or more corresponding video objects.

FIG. 6 is a simplified system implementing the method 100 for characterizing and fingerprinting a digital video object according to an embodiment of the present invention. This diagram is merely an example, which should not unduly limit the scope of the claims. One of ordinary skill in the art would recognize many variations, alternatives, and modifications. The system 600 includes a decoder module 610, a fingerprinting module 620, a fingerprint database 630, and an application policy module 640. Although the above has been shown using a selected group of components for the system, there can be many alternatives, modifications, and variations. For example, some of the modules may be expanded and/or combined. Other modules may be inserted to those noted above. Depending upon the embodiment, the arrangement of modules may be interchanged with others replaced. As an example, some or all processes of the method are performed by a computer or a processor directed by a code. In another example, some or all processes of the method are performed according to instructions included by a computer-readable medium in a computer program product. Further details of these processes are found throughout the present specification.

As shown in FIG. 6, an input video is decoded by the decoder module 610 and fed to the fingerprinting module 620. The fingerprinting module 620 performs the method 100 according to an embodiment of the present invention. For example, the fingerprinting module 620 is implemented according to FIGS. 1, 2, 3, 4, and/or 5. The resulting video fingerprint is compared to the ones stored in the fingerprint database for identification, and the identification result is returned to the application along with associated metadata (e.g., title and ownership of the video content). Based on the identification result, the application applies certain policy at the application policy module 640. For example, if the video is identified to be a pirated version or copy, the application applies filtering.

As discussed above and further emphasized here, FIG. 6 is merely an example, which should not unduly limit the scope of the claims. One of ordinary skill in the art would recognize many variations, alternatives, and modifications. For example, anyone of the modules 610, 620, 630, and 640 can be either hardware or software, or a combination of hardware and software. In another example, the fingerprint database 630 can be embedded in an application or resided outside the application on a local hard drive or a remote server.

According to another embodiment of the present invention, a method for generating a fingerprint for a video object includes obtaining a plurality of frames associated with a video object. Additionally, the method includes, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponding to a plurality of frame rates respectively. Moreover, the method includes, for each of the plurality of frames, processing information associated with the plurality of spatial signatures and the plurality of temporal signatures, and determining a frame fingerprint for the each of the plurality of frames, the frame fingerprint including the plurality of spatial signatures corresponding to the plurality of resolutions respectively and the plurality of temporal signatures corresponding to the plurality of frame rates respectively. Also, the method includes processing a plurality of frame fingerprints for the plurality of frames respectively, the plurality of frame fingerprints including the frame fingerprint for the each of the plurality of frames. Additionally, the method includes determining a video fingerprint for the video object, the video fingerprint including the plurality of frame fingerprints. For example, the method is implemented according to FIGS. 1, 2, 3, 4, and/or 5.

According to yet another embodiment of the present invention, a method for generating a spatial signature for a frame of a video object includes obtaining a frame associated with a video object, and dividing the frame into a plurality of blocks, the plurality of blocks corresponding to a plurality of locations respectively. Each of the plurality of blocks includes a plurality of pixels, and the plurality of pixels corresponds to a plurality of pixel values respectively. Additionally, the method includes determining a plurality of average pixel values for the plurality of blocks respectively, processing the plurality of average pixel values, and determining a plurality of ranks for the plurality of blocks respectively based on at least information associated with the plurality of average pixel values. Each of the plurality of ranks corresponds to a block. Moreover, the method includes processing information associated with the plurality of ranks, and determining a sequence of ranks based on at least information associated with the plurality of ranks and the plurality of locations. A spatial signature for the frame includes information associated with the sequence of ranks. For example, the method is implemented according to FIGS. 1, 2, and/or 3.

According to yet another embodiment of the present invention, a method for generating a temporal signature for a frame of a video object includes obtaining a first plurality of frames associated with a video object. The first plurality of frames includes at least a frame, each of the first plurality of frames includes a first plurality of pixels and corresponds to an adjacent frame, and the adjacent frame includes a second plurality of pixels. Additionally, the method includes processing information associated with the first plurality of frames, and determining a plurality of difference values for the first plurality of frames respectively. Each of the plurality of difference values corresponds to the each of the first plurality of frames and the adjacent frame. Moreover, the method includes processing information associated with the plurality of difference values, and determining a plurality of ranks corresponding to the first plurality of frames respectively based on at least information associated with the plurality of difference values. The plurality of ranks includes a rank corresponding to the frame, and the rank is a temporal signature for the frame. For example, the method is implemented according to FIGS. 1, 4, and/or 5.

According to yet another embodiment of the present invention, a method for generating a spatial-temporal signature for a frame of a video object includes obtaining a first plurality of frames associated with a video object. The first plurality of frames includes at least a frame, and each of the first plurality of frames corresponds to an adjacent frame. Additionally, the method includes dividing each of the first plurality of frames. The divided frame includes a first plurality of blocks corresponding to a plurality of locations respectively, each of the first plurality of blocks corresponds to a second plurality of blocks including the each of the first plurality of blocks, and the second plurality of blocks is associated with blocks on the first plurality of frames respectively. Moreover, the method includes processing information associated with the first plurality of frames. Also, the method includes, for each of the first plurality of blocks, determining a plurality of difference values for the second plurality of blocks respectively. Each of the plurality of difference values is associated with the each of the second plurality of blocks and a corresponding block on the adjacent frame. Additionally, the method includes, for each of the first plurality of blocks, processing information associated with the plurality of difference values, determining a first plurality of ranks corresponding to the second plurality of blocks respectively based on at least information associated with the plurality of difference values, processing information associated with the first plurality of ranks, and determining a rank for the each of the first plurality of blocks based on at least information associated with the first plurality of ranks. Moreover, the method includes processing information associated with a second plurality of ranks corresponding to the first plurality of blocks respectively, and determining a sequence of ranks based on at least information associated with the second plurality of ranks and the plurality of locations for the first plurality of blocks. The second plurality of ranks includes the rank, and a spatial-temporal signature for the frame includes information associated with the sequence of ranks. For example, the method is implemented according to FIGS. 1, 2, 3, 4, and/or 5.

According to yet another embodiment of the present invention, a computer program product includes a computer readable medium including instructions for generating a fingerprint for a video object. The computer readable medium includes one or more instructions for obtaining a plurality of frames associated with a video object. Additionally, the computer readable medium includes one or more instructions for, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponds to a plurality of frame rates respectively. Moreover, the one or more instructions are for, for each of the plurality of frames, processing information associated with the plurality of spatial signatures and the plurality of temporal signatures, and determining a frame fingerprint for the each of the plurality of frames. The frame fingerprint includes the plurality of spatial signatures corresponding to the plurality of resolutions respectively and the plurality of temporal signatures corresponding to the plurality of frame rates respectively. Also, the computer readable medium includes one or more instructions for processing a plurality of frame fingerprints for the plurality of frames respectively, and one or more instructions for determining a video fingerprint for the video object. The plurality of frame fingerprints includes the frame fingerprint for the each of the plurality of frames, and the video fingerprint includes the plurality of frame fingerprints. For example, the computer program product is implemented according to FIGS. 1, 2, 3, 4, 5 and/or 6.

According to yet another embodiment of the present invention, a computer program product includes a computer readable medium including instructions for generating a spatial signature for a frame of a video object. The computer readable medium includes one or more instructions for obtaining a frame associated with a video object, and one or more instructions for dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the computer readable medium includes one or more instructions for determining a plurality of average pixel values for the plurality of blocks respectively, one or more instructions for processing the plurality of average pixel values, and one or more instructions for determining a plurality of ranks for the plurality of blocks respectively based on at least information associated with the plurality of average pixel values, each of the plurality of ranks corresponding to a block. Moreover, the computer readable medium includes one or more instructions for processing information associated with the plurality of ranks, and one or more instructions for determining a sequence of ranks based on at least information associated with the plurality of ranks and the plurality of locations. A spatial signature for the frame includes information associated with the sequence of ranks. For example, the computer program product is implemented according to FIGS. 1, 2, 3, and/or 6.

According to yet another embodiment of the present invention, a computer program product includes a computer readable medium including instructions for generating a temporal signature for a frame of a video object. The computer readable medium includes one or more instructions for obtaining a first plurality of frames associated with a video object. The first plurality of frames includes at least a frame, each of the first plurality of frames includes a first plurality of pixels and corresponds to an adjacent frame, and the adjacent frame includes a second plurality of pixels. Additionally, the computer readable medium includes one or more instructions for processing information associated with the first plurality of frames, and one or more instructions for determining a plurality of difference values for the first plurality of frames respectively. Each of the plurality of difference values corresponding to the each of the first plurality of frames and the adjacent frame. Moreover, the computer readable medium includes one or more instructions for processing information associated with the plurality of difference values, and one or more instructions for determining a plurality of ranks corresponding to the first plurality of frames respectively based on at least information associated with the plurality of difference values. The plurality of ranks includes a rank corresponding to the frame, and the rank is a temporal signature for the frame. For example, the computer program product is implemented according to FIGS. 1, 4, 5 and/or 6.

According to yet another embodiment of the present invention, a computer program product includes a computer readable medium including instructions for generating a spatial-temporal signature for a frame of a video object. The computer readable medium includes one or more instructions for obtaining a first plurality of frames associated with a video object. The first plurality of frames includes at least a frame, and each of the first plurality of frames corresponds to an adjacent frame. Additionally, the computer readable medium includes one or more instructions for dividing each of the first plurality of frames. The divided frame includes a first plurality of blocks corresponding to a plurality of locations respectively, each of the first plurality of blocks corresponds to a second plurality of blocks including the each of the first plurality of blocks, and the second plurality of blocks is associated with blocks on the first plurality of frames respectively. Moreover, the computer readable medium includes one or more instructions for processing information associated with the first plurality of frames. Also, the computer readable medium includes one or more instructions for, for each of the first plurality of blocks, determining a plurality of difference values for the second plurality of blocks respectively, processing information associated with the plurality of difference values, determining a first plurality of ranks corresponding to the second plurality of blocks respectively based on at least information associated with the plurality of difference values, processing information associated with the first plurality of ranks, and determining a rank for the each of the first plurality of blocks based on at least information associated with the first plurality of ranks. Each of the plurality of difference values is associated with the each of the second plurality of blocks and a corresponding block on the adjacent frame. Additionally, the computer readable medium includes one or more instructions for processing information associated with a second plurality of ranks corresponding to the first plurality of blocks respectively, and one or more instructions for determining a sequence of ranks based on at least information associated with the second plurality of ranks and the plurality of locations for the first plurality of blocks. The second plurality of ranks includes the rank, and a spatial-temporal signature for the frame includes information associated with the sequence of ranks. For example, the computer program product is implemented according to FIGS. 1, 2, 3, 4, 5 and/or 6.

The present invention has various advantages. Certain embodiments of the present invention can generate a robust fingerprint which either does not change or change only slightly with different formats, bitrates, or resolutions, and/or with certain alterations and/or distortions for the same video object. Some embodiments of the present invention can generate a fingerprint that is highly discriminating so that two video objects containing different video contents would yield significantly different fingerprints. Certain embodiments of the present invention can generate a fingerprint that is compact for storage, and can be stored in a form for efficient search and matching.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer implemented method for generating a fingerprint for a video object that is performed by a computer system programmed to perform the method, comprising:
   obtaining, by the computer system, a plurality of frames associated with a video object;
   for each of the plurality of frames,
      processing, by the computer system, information associated with the plurality of frames;
      determining, by the computer system, a plurality of spatial signatures for the each of the plurality of frames based on at least information associated with the each of the plurality of frames, the plurality of spatial signatures corresponding to a plurality of resolutions respectively;
      determining, by the computer system, a plurality of temporal signatures for the each of the plurality of frames based on at least information associated with the plurality of frames, the plurality of temporal signatures corresponding to a plurality of frame rates respectively;
      processing, by the computer system, information associated with the plurality of spatial signatures and the plurality of temporal signatures; and
      determining a frame fingerprint for the each of the plurality of frames, the frame fingerprint including the plurality of spatial signatures corresponding to the plurality of resolutions respectively and the plurality of temporal signatures corresponding to the plurality of frame rates respectively;
   processing, by the computer system, a plurality of frame fingerprints for the plurality of frames respectively, the plurality of frame fingerprints including the frame fingerprint for the each of the plurality of frames;
   determining, by the computer system, a video fingerprint for the video object, the video fingerprint including the plurality of frame fingerprints; and
   storing, by the computer system, the video fingerprint for the video object in a data storage separate from the video object, wherein the video object is not modified by the video fingerprint.

2. The method of claim 1, and further comprising:
   for the each of the plurality of frames,
      determining, by the computer system, a plurality of spatial-temporal signatures for the each of the plurality of frames based on at least information associated with the plurality of frames, the plurality of spatial-temporal signatures corresponding to a plurality of combinations of resolutions and frame rates respectively;
      processing, by the computer system, information associated with the plurality of spatial-temporal signatures;
   wherein the frame fingerprint further including the plurality of spatial-temporal signatures corresponding to the plurality of combinations of resolutions and frame rates respectively.

3. The method of claim 1, and further comprising:
   for the each of the plurality of frames, storing, by the computer system the frame fingerprint for the each of the plurality of frames in the data storage.

4. The method of claim 1, and further comprising storing, by the computer system, the video fingerprint for the video object in a video fingerprint database.

5. The method of claim 1 wherein the determining a plurality of spatial signatures comprises for each of the plurality of resolutions, dividing, by the computer system, the each of the plurality of frames into a number of columns and a number of rows, the each of the plurality of resolutions begin represented by, at least, the number of columns and the number of rows.

6. The method of claim 1 wherein the determining a plurality of temporal signatures comprises for each of the plurality of frame rates, determining, by the computer system, a difference value corresponding to the each of the plurality of frames and an adjacent frame associated with the each of the plurality of frames, the each of the plurality of frame rates being inversely proportional to an time interval between the each of the plurality of frames and the adjacent frame.

7. A computer implemented method for generating a spatial signature for a frame of a video object with a computer system programmed to perform the method, comprising:
   obtaining, by the computer system, a frame associated with a video object;
   dividing, by the computer system, the frame into a plurality of blocks, the plurality of blocks corresponding to a plurality of locations respectively, each of the plurality of blocks including a plurality of pixels, the plurality of pixels corresponding to a plurality of pixel values respectively;
   determining, by the computer system, a plurality of average pixel values for the plurality of blocks respectively;
   processing, by the computer system, the plurality of average pixel values;
   determining, by the computer system, a plurality of ranks for the plurality of blocks respectively based on at least information associated with the plurality of average pixel values, each of the plurality of ranks corresponding to a block;
   processing, by the computer system, information associated with the plurality of ranks;
   determining, by the computer system, a sequence of ranks based on at least information associated with the plurality of ranks and the plurality of locations; and
   storing a spatial signature for the frame in a data storage separate from the video object, wherein the spatial signature for the frame includes information associated with the sequence of ranks, and wherein the frame of the video object is not modified by the spatial signature.

8. The method of claim 7 wherein the determining a sequence of ranks comprises:
   scanning, by the computer system, the plurality of blocks based on a predetermined pattern;
   determining, by the computer system, a sequence of blocks as a result of the scanning process; and
   arranging, by the computer system, the each of the plurality of ranks based on a location of the corresponding block in the sequence of blocks.

9. The method of claim 8 wherein the predetermined pattern is associated with a raster scan.

10. The method of claim 7 wherein the plurality of ranks is a plurality of ordinal ranks.

11. The method of claim 7 wherein:
the dividing the frame into a plurality of blocks includes dividing, by the computer system, the frame into a number of columns and a number of rows;
wherein the spatial signature for the frame corresponds to a resolution represented by, at least, the number of columns and the number of rows.

12. The method of claim 11 wherein the resolution is a base resolution, and the spatial signature is a based spatial signature.

13. A computer implemented method for generating a temporal signature for a frame of a video object that is performed by a computer system programmed to perform the method, comprising:
obtaining, by the computer system, a first plurality of frames associated with a video object, the first plurality of frames including at least a frame, each of the first plurality of frames including a first plurality of pixels and corresponding to an adjacent frame, the adjacent frame including a second plurality of pixels;
processing, by the computer system, information associated with the first plurality of frames;
determining, by the computer system, a plurality of difference values for the first plurality of frames respectively, each of the plurality of difference values corresponding to the each of the first plurality of frames and the adjacent frame;
processing, by the computer system, information associated with the plurality of difference values;
determining, by the computer system, a plurality of ranks corresponding to the first plurality of frames respectively based on at least information associated with the plurality of difference values, the plurality of ranks including a rank corresponding to the frame, the rank being a temporal signature for the frame; and
storing, by the computer system, the temporal signature for the frame in a data store separate from the video object, wherein the first plurality of frames associated with the video object are not modified by the temporal signature.

14. The method of claim 13, and further comprising:
obtaining, by the computer system, a second plurality of frames;
processing, by the computer system, information associated with the second plurality of frames; and
determining, by the computer system, the first plurality of frames based on at least information associated with the second plurality of frames.

15. The method of claim 14 wherein the determining the first plurality of frames comprises:
receiving, by the computer system, information associated with a time period including a start time and an end time;
placing, by the computer system, the frame at the start time of the time period; and
selecting, by the computer system, at least some frames from the second plurality of frames within the time period, the first plurality of frames including the selected frames.

16. The method of claim 13 wherein the determining a plurality of difference values comprises:
for the each of the first plurality of frames,
determining, by the computer system, magnitudes of differences between first values for the first plurality of pixels and second values for the second plurality of pixels respectively;
summing, by the computer system, the magnitudes of differences to determine one of the plurality of difference values.

17. The method of claim 13 wherein the plurality of ranks is a plurality of ordinal ranks.

18. The method of claim 13 wherein:
the first plurality of frames corresponds to a first frame rate, the rank being the temporal signature for the frame corresponding to the first frame rate.

19. The method of claim 18, wherein
the video object corresponds to a second frame rate;
wherein if the first frame rate is lower than the second frame rate, the first plurality of frames are downsampled frames for the video object.

20. A computer implemented method for generating a spatial-temporal signature for a frame of a video object with a computer system programmed to perform the method, comprising:
obtaining, by the computer system, a first plurality of frames associated with a video object, the first plurality of frames including at least a frame, each of the first plurality of frames corresponding to an adjacent frame;
dividing, by the computer system, each of the first plurality of frames, wherein the divided frame includes a first plurality of blocks corresponding to a plurality of locations respectively, each of the first plurality of blocks corresponding to a second plurality of blocks including the each of the first plurality of blocks, the second plurality of blocks being associated with blocks on the first plurality of frames respectively;
processing, by the computer system, information associated with the first plurality of frames;
for each of the first plurality of blocks,
determining, by the computer system, a plurality of difference values for the second plurality of blocks respectively, each of the plurality of difference values being associated with the each of the second plurality of blocks and a corresponding block on the adjacent frame;
processing, by the computer system, information associated with the plurality of difference values;
determining, by the computer system, a first plurality of ranks corresponding to the second plurality of blocks respectively based on at least information associated with the plurality of difference values;
processing, by the computer system, information associated with the first plurality of ranks;
determining, by the computer system, a rank for the each of the first plurality of blocks based on at least information associated with the first plurality of ranks;
processing, by the computer system, information associated with a second plurality of ranks corresponding to the first plurality of blocks respectively, the second plurality of ranks including the rank;
determining, by the computer system, a sequence of ranks based on at least information associated with the second plurality of ranks and the plurality of locations for the first plurality of blocks; and
storing, by the computer system, a spatial-temporal signature for the frame independent of the video object, wherein the spatial-temporal signature for the frame includes information associated with the sequence of ranks, and wherein the first plurality of frames associated with the video object are not modified by the spatial-temporal signature.

21. The method of claim 20 wherein the first plurality of blocks are on a same frame at a same instant in time.

22. The method of claim 20 wherein the second plurality of blocks are at a same location on different frames respectively along a temporal axis.

23. The method of claim 20 wherein the determining a sequence of ranks comprises:
scanning, by the computer system, the first plurality of blocks based on a predetermined pattern;
determining, by the computer system, a sequence of blocks on the frame as a result of the scanning process; and
arranging, by the computer system, the each of the second plurality of ranks based on a location of the corresponding block in the sequence of blocks.

24. The method of claim 20 wherein:
the first plurality of frames corresponds to a first frame rate, the spatial-temporal signature for the frame corresponding to the first frame rate.

25. The method of claim 24, wherein
the video object corresponds to a second frame rate;
if the first frame rate is lower than the second frame rate, the first plurality of frames are down-sampled frames for the video object.

26. The method of claim 20, and further comprising:
obtaining, by the computer system, a second plurality of frames;
processing, by the computer system, information associated with the second plurality of frames;
determining, by the computer system, the first plurality of frames based on at least information associated with the second plurality of frames.

27. The method of claim 26 wherein the determining the first plurality of frames comprises:
receiving, by the computer system, information associated with a time period including a start time and an end time;
placing, by the computer system, the frame at the start time of the time period; and
selecting, by the computer system, at least some frames from the second plurality of frames within the time period, the first plurality of frames including the selected frames.

28. A non-transitory computer readable medium including instructions that programs a processor of a computer system to generate a fingerprint for a video object, the non-transitory computer readable medium comprising:
one or more instructions that programs the processor to obtain a plurality of frames associated with a video object;
one or more instructions for each of the plurality of frames,
that programs the processor to process information associated with the plurality of frames;
that programs the processor to determine a plurality of spatial signatures for the each of the plurality of frames based on at least information associated with the each of the plurality of frames, the plurality of spatial signatures corresponding to a plurality of resolutions respectively;
that programs the processor to determine a plurality of temporal signatures for the each of the plurality of frames based on at least information associated with the plurality of frames, the plurality of temporal signatures corresponding to a plurality of frame rates respectively;
that programs the processor to process information associated with the plurality of spatial signatures and the plurality of temporal signatures;
that programs the processor to determine a frame fingerprint for the each of the plurality of frames, the frame fingerprint including the plurality of spatial signatures corresponding to the plurality of resolutions respectively and the plurality of temporal signatures corresponding to the plurality of frame rates respectively;
one or more instructions that programs the processor to process a plurality of frame fingerprints for the plurality of frames respectively, the plurality of frame fingerprints including the frame fingerprint for the each of the plurality of frames;
one or more instructions that programs the processor to determine a video fingerprint for the video object, the video fingerprint including the plurality of frame fingerprints; and
one or more instructions that programs to processor to store the video fingerprint for the video object in a memory storage separately from the video object, wherein the plurality of frames associated with the video object are not modified.

29. A non-transitory computer readable medium including instructions that programs a processor of a computer system to generate a spatial signature for a frame of a video object, the non-transitory computer readable medium comprising:
one or more instructions that programs the processor to obtain a frame associated with a video object;
one or more instructions that programs the processor to divide the frame into a plurality of blocks, the plurality of blocks corresponding to a plurality of locations respectively, each of the plurality of blocks including a plurality of pixels, the plurality of pixels corresponding to a plurality of pixel values respectively;
one or more instructions that programs the processor to determine a plurality of average pixel values for the plurality of blocks respectively;
one or more instructions that programs the processor to process the plurality of average pixel values;
one or more instructions that programs the processor to determine a plurality of ranks for the plurality of blocks respectively based on at least information associated with the plurality of average pixel values, each of the plurality of ranks corresponding to a block;
one or more instructions that programs the processor to process information associated with the plurality of ranks;
one or more instructions that programs the processor to determine a sequence of ranks based on at least information associated with the plurality of ranks and the plurality of locations; and
one or more instructions that programs the processor to store a spatial signature for the frame in a memory separately from the video object, wherein the spatial signature for the frame includes information associated with the sequence of ranks, wherein the frame associated with the video object is not modified by the spatial signature.

30. A non-transitory computer readable medium including instructions that programs a processor of a computer system to generate a temporal signature for a frame of a video object, the non-transitory computer readable medium comprising:
one or more instructions that programs the processor to obtain a first plurality of frames associated with a video object, the first plurality of frames including at least a frame, each of the first plurality of frames including a first plurality of pixels and corresponding to an adjacent frame, the adjacent frame including a second plurality of pixels;
one or more instructions that programs the processor to process information associated with the first plurality of frames;

one or more instructions that programs the processor to determine a plurality of difference values for the first plurality of frames respectively, each of the plurality of difference values corresponding to the each of the first plurality of frames and the adjacent frame;

one or more instructions that programs the processor to process information associated with the plurality of difference values;

one or more instructions that programs the processor to determine a plurality of ranks corresponding to the first plurality of frames respectively based on at least information associated with the plurality of difference values, the plurality of ranks including a rank corresponding to the frame, the rank being a temporal signature for the frame; and one or more instructions that programs the processor to store the temporal signature for the frame in a fingerprint database separate from the video object, wherein the video object is not modified by the temporal signature.

31. A non-transitory computer readable medium including instructions that programs a processor a computer system to generate a spatial-temporal signature for a frame of a video object, the non-transitory computer readable medium comprising:

one or more instructions that programs the processor to obtain a first plurality of frames associated with a video object, the first plurality of frames including at least a frame, each of the first plurality of frames corresponding to an adjacent frame;

one or more instructions that programs the processor to dividing each of the first plurality of frames, wherein the divided frame includes a first plurality of blocks corresponding to a plurality of locations respectively, each of the first plurality of blocks corresponding to a second plurality of blocks including the each of the first plurality of blocks, the second plurality of blocks being associated with blocks on the first plurality of frames respectively;

one or more instructions that programs the processor to process information associated with the first plurality of frames;

one or more instructions, for each of the first plurality of blocks, that programs the processor to determine a plurality of difference values for the second plurality of blocks respectively, each of the plurality of difference values being associated with the each of the second plurality of blocks and a corresponding block on the adjacent frame;

that programs the processor to process information associated with the plurality of difference values;

that programs the processor to determine a first plurality of ranks corresponding to the second plurality of blocks respectively based on at least information associated with the plurality of difference values;

that programs the processor to process information associated with the first plurality of ranks;

that programs the processor to determine a rank for the each of the first plurality of blocks based on at least information associated with the first plurality of ranks;

one or more instructions for processing information associated with a second plurality of ranks corresponding to the first plurality of blocks respectively, the second plurality of ranks including the rank;

one or more instructions that programs the processor to determine a sequence of ranks based on at least information associated with the second plurality of ranks and the plurality of locations for the first plurality of blocks; and one or more instructions that programs the processor to store the spatial-temporal signature for the frame in a fingerprint database separate from the video object, wherein the spatial-temporal signature for the frame includes information associated with the sequence of ranks, and wherein the video object is not modified by the spatial-temporal signature.

* * * * *